Oct. 25, 1927.
D. W. OHAVER
LEAK DETECTOR
Filed Sept. 4, 1926
1,646,928
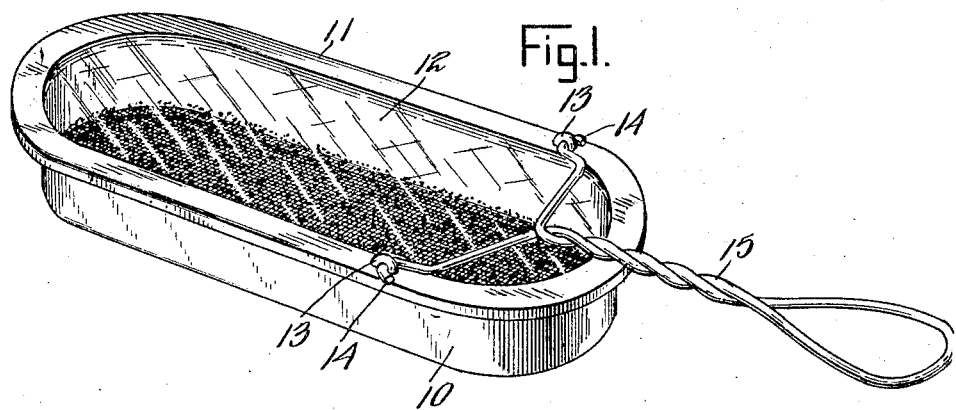
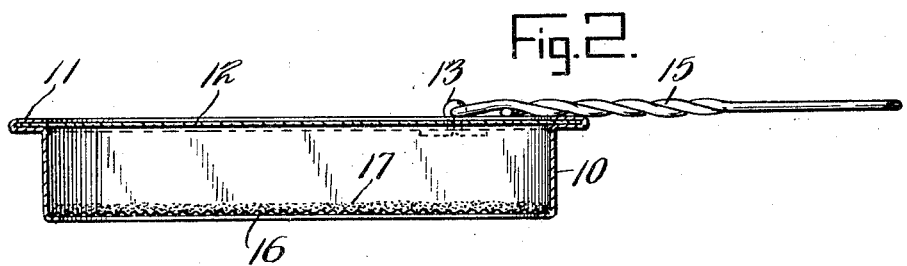
Inventor
David W. Ohaver
By
Attorney Patented Oct. 25, 1927.

1,646,928

UNITED STATES PATENT OFFICE.

DAVID W. OHAVER, OF ROCKVILLE, INDIANA.

LEAK DETECTOR.

Application filed September 4, 1926. Serial No. 133,600.

My invention relates to leak detectors designed primarily for locating punctures or leaks in automobile tubes but applicable for use in detecting leaks in gas pipes or other pressure containing devices.

An object of the invention is to provide a simple and inexpensive device of this character which is not affected by climatic conditions such as moisture and the like and which is consequently of greater usefulness and of superior construction.

Referring to the accompanying drawings which are made a part hereof and on which similar reference characters indicate similar parts, Figure 1 is a perspective view illustrating one application of my invention, and Figure 2, a central longitudinal vertical section.

In the drawings reference character 10 indicates a body formed preferably of sheet metal and having a rim 11 about its edge providing a holding frame for a transparent cover 12, as for example celluloid, mounted therein. The rim 11 projects outwardly around the container and forms an annular flange and through which hinge elements or pins 13 are inserted for engagement by the divergent forks 14 of a handle 15.

In the use of the device the handle is adapted to be disposed in the position shown in Figure 1. However, when the device is put away or not in use the handle 15 is adapted to be turned over in position to overlie the transparent cover and form a projection therefor. The lower edge of the body 10 is turned in at 10' to form a narrow internal annular flange upon which is secured in any desired manner, as by welding or the like, a reticulated screen 16 of very fine mesh. Within said body on said screen are disposed mica flakes 17 or other small particles of material which will not absorb moisture.

Heretofore devices of the same general character have been constructed, with small bits or scraps of paper, cotton, or the like but the same have proven unsatisfactory since they are affected by weather conditions and in wet weather absorb moisture and stick together. The material of which the device is constructed is preferably of non-corrodible or rust-resisting character and a device constructed as described will last indefinitely.

It will be obvious to those skilled in the art that various changes may be made in my device without departing from the spirit of the invention and therefore I do not limit myself to what is shown in the drawings and described in the specification but only as indicated in the appended claims.

Having thus fully described my said invention, what I claim as new and desire to secure by Letters Patent, is:

1. A leak detector comprising an elongated sheet metal ring-like body having a rim around its upper portion, a transparent cover for said body retained by said rim, the bottom portion of said body extending inwardly forming a flange, a reticulated screen secured on said flange, and non-moisture absorbing light-weight particles in said body, substantially as set forth.

2. A leak detector comprising a ring-like body formed of sheet metal having its upper portion spun over to form an annular external rim or flange, a transparent cover of celluloid retained by said spun over rim, a handle pivoted to said rim and positioned over said transparent cover for protecting the same when not in use, the lower portion of said body being bent inwardly to form an internal annular flange, a recticulated bottom for said body, and mica flakes in said body, substantially as set forth.

In witness whereof, I have hereunto set my hand at Indianapolis, Indiana, this 3rd day of September, A. D. nineteen hundred and twenty-six.

DAVID W. OHAVER.